United States Patent [19]

Maret

[11] 3,878,197

[45] Apr. 15, 1975

[54] PROCESS FOR PREPARING EXTRACTS OF ALOE VERA

[75] Inventor: Ray H. Maret, Garland, Tex.

[73] Assignees: Ray H. Maret; Henry R. Cobble, both of Garland, Tex.

[22] Filed: Dec. 13, 1972

[21] Appl. No.: 314,534

[52] U.S. Cl. .......... 260/236.5; 204/160.1; 424/195
[51] Int. Cl. ............................ C07g 1/00; B01j 1/10
[58] Field of Search ...... 204/160.1; 260/236, 236.5, 260/124 R, 529; 424/195, 364, 180

[56] References Cited
UNITED STATES PATENTS

| | | | |
|---|---|---|---|
| 3,103,466 | 9/1963 | Farkas | 260/210 R |
| 3,360,511 | 12/1967 | Farkas | 260/209 |
| 3,362,951 | 1/1968 | Farkas | 260/209 |
| 3,470,109 | 9/1969 | Marsh | 424/180 |

*Primary Examiner*—Murray Tillman
*Assistant Examiner*—Thurman Kennis Page
*Attorney, Agent, or Firm*—Jack A. Kanz

[57] ABSTRACT

Disclosed is a process for extracting and stabilizing juice from leaves of the aloe vera plant. The gel is removed by trimming the rind and aloin layer from the leaf and the remaining gel digested under ultraviolet radiation at ambient temperature to produce a biologically sterile and chemically stable extract of composition having characteristics similar to fresh aloe vera juice.

7 Claims, No Drawings

PROCESS FOR PREPARING EXTRACTS OF ALOE VERA

This invention relates to processes for preparation of extracts of aloe vera juice. More particularly it relates to a process for removing gel from the aloe vera leaf and preparing therefrom an extract having the essential composition of fresh aloe vera juice but which is biologically sterile and attenuated to prevent oxidation and degradation.

The juice or gel from the aloe vera leaf, in its fresh state, has long been used for topical treatment for burns, insect bites and skin conditions of various types. Recently the fresh gel has been found to be an effective treatment for ulcers, various types of arthritis, myopathies and the like, and may be used for topical treatment as well as internally. Because of its medicinal value aloe vera extract has been widely used as a base for cosmetic products.

Unfortunately the aloe vera gel, when exposed to air, oxidizes rapidly, decomposing and losing much of its medicinal value. Furthermore, for internal use, the juice must be biologicaly sterile. Previous sterilization processes have accentuated the oxidation and decomposition problems, thereby severely inhibiting the medicinal value of the prepared extract.

Since the aloe vera plant can only be grown commercially in tropical or sub-tropical climates means must be provided for transportation and distribution in the more populated regions of the world. Furthermore, the gel must be extracted from the leaf for use and must be sterilized and stabilized before it can be commerically distributed in a form which has a long shelf life. Previous attempts at preparation of an extract generally involved crushing the leaves to extract the gel from the leaf. However, the aloe vera contains a layer of aloins between the rind and the gel which is a bitter cathartic. Crushing the leaves causes contamination of the gel with aloins, rendering the extract unsatisfactory for internal consumption and discoloring the extract.

In accordance with the present invention an extract of aloe vera juice is prepared by first sterilizing the entire leaf. The rind and aloin layer are then physically separated from the gel by dissecting the leaf to remove the rind and a layer to a depth of approximately one-eighth inch. The remaining gel is then processed under sterile conditions and digested under U.V. radiation at ambient temperature. Ascorbic acid is added during the digesting process to compensate for the loss thereof through oxidation upon exposure to air and a source of potassium ions included in the digestion liquid. The pH is maintained at about 4.5 during the entire process so that the quinones and lignins may be stereochemically associated. The resultant extract is a clear liquid having a chemical composition almost identical with that of the fresh juice. The juice, however, does not readily oxidize so that it may be bottled and shipped for use. Because of the stabilization and sterilization process the extract has a high shelf life and maintains its original beneficial chemical composition. Since the juice is extracted under sterile conditions at ambient temperatures, degradation is essentially avoided. Furthermore, by removing the aloins with its rind the extract maintains the clear color and has the taste of citrus juice, rendering the product readily suitable for internal consumption wiht an effectiveness near that of the fresh gel. These and other advantages of the invention will become more fully understood when taken in connection with the following detailed description.

The aloe vera plant is commercially cultivated in tropical and sub-tropical climates. The leaf is havested by merely cutting the leaf from the plant when the leaf has reached the desired state of maturity.

In its natural state the rind provides an effective container for shipment of the gel with only the cut end open. However, since the juice is contained in a thick mucus-like gel, the cut end quickly oxidizes to form a thick scum which effectively seals the juice within the leaf for shipment. The leaves may then be transported in the natural state. It is, of course, desirable to process the leaf as soon after harvesting as possible. In most cases, however, the aloe vera leaf may be shipped or stored for ten to fourteen days without deterioration.

Upon arrival at the processing area the leaves are inspected for evidence of deterioration. Bruised, damaged or decaying leaves must not be used. The selected leaves are then washed with a mild detergent, rinsed in a chlorine solution, rinsed with deionized water and aseptically dried.

A commercial pressure spray diswasher has been found satisfactory for the wahsing operation. Likewise, comercial detergents are suitable. The chlorine solution is preferably formed by dissolving three-forths cup calcium hypochlorite per gallon of water. Other chlorine solutions are acceptable.

The dry sterile leaves are transported under aseptic conditions to a sterile processing area. Thereafter the entire process, from opening the leaf to bottling the extract, is carried out in a completely sterilized aseptic environment.

The outer hull is removed by cutting to a depth of at least one-eighth inch, leaving only the clear core of gel. The gel is then immediately placed in a digestion tank and digested. Digestion is accomplished by agitating the gel in a digestion solution maintained at ambient temperatures and continuously exposed to U.V. radiation.

The digestion liquid comprises a solution of glycine, a surfactant, citric acid, L-ascorbic acid, a source of potassium ions and buffering agents. In the preferred embodiment the gel is processed in 200 gallon batches. Accordingly, to produce a 200 gallon batch, 220 pounds of fresh gel is placed in stainless steel mixer. Agitation is started and the following components added in the following amounts:

| | |
|---|---|
| Citric acid | 14.00 pounds |
| Ascorbic acid | 2.00 pounds |
| Glycine | 24.80 pounds |
| Potassium chloride | 1.23 pounds |
| Potassium gluconate | 179 grams |

The mixer is allowed to agitate the composition for about five minutes and then the following materials and components are added:

| | |
|---|---|
| Tween-80 | 160 grams |
| 75% phosphoric acid | 1.00 pounds |

Make up water is added to produce 200 gallons of mixture and the mixture is then agitated under U.V. radiation for approximately four hours. The liquid is then pumped from the tank and filtered to remove residual cellulose. The filtered liquid is then bottled for use.

In the process described stereochemical polymerization of long chain of amino acid polymers, in the presence of amine phosphates and under U.V. radiation, produces amino lignins and phospholignins. Under 2,600 Angstroms radiation sodium, potassium, chloride, phosphorous and other elements in rather weak concentrations act as the electromotive ions for effecting the sterechemical transfer of phosphorous and ionized amines to combine loosely with available quinones and lignins. Oxidation is prevented by maintaining pH at approximately 4.5. The quinones and lignins stoichiometrically stereochemically attach to the potassium, phosphorous and amines to produce the end product, amine phospholiginin and potassium quinoneamine of loose structural bonds. Ascorbic acid and citric acid assist in buffering the solution and replacing the vitamin C lost to oxidation upon exposure to air when the gel is first removed from the leaf.

The reaction described is promoted by U.V. radiation of about 2,600 Angstroms. This wavelength penetrates approximately two inches in the substrate. Approximately 2 to 4 seconds at 1 millivolt is required to initiate stereochemical reaction. To promote the reaction the pH must be maintained at about 3 to about 4.5. The reaction also must take place in the presence of amine with sufficient phosphorus and potassium ions to effect the transfer. The transfer is further assisted by use of a wetting agent.

Various other chemicals may be substituted for those listed above in the preferred composition. Selection of components providing the desired chemical reactions is limited only by toxicity and taste of the end product.

The time for digestion depends upon exposure to the U.V. radiation. The U. V. Promotes the reaction primarily by breaking down the lignins and quinones so the stereochemical transfer can occur.

Glycine has been found to be the most successful amine because of its relatively simple structure and indestructibility to the U.V. wavelength used.

All components of the digestion mixture are of USP grade or better. In the preferred embodiment Tween 80 is used as a surfactant. Tween 80 is the common name for a mixture of polyoxyethylene ethers of mixed partial oleic ester of sorbitol anhydrides sold commercially and is available in USP grade.

L-ascorbic acid is used primarily to buffer the solution against oxidation loss of Vitamin C. The other components are used primarily to buffer the solution and to provide ready sources of potassium ions. As noted above, under U.V. radiation the lignins and quinones are broken down and loosely associated with the potassium and amines. Using the process described, very little cellulose residue remains, indicating high effective digestion. Since the lignins are stereochemically polymerized, an extremely high proportion of lignins are dissolved in the final solution. Preliminary tests indicate that the lignin in solution in the final product is approximately ten to fifteen times the amount of lignin in solution in fresh juice. Furthermore, the extract is quite stable and has an indefinite shelf life.

While the invention has been described with particular reference to specific digestion solutions it will be apparent to those skilled in the art that similar compositions maintaining the desired pH and ionic constituents for producing the desired reactions will produce similar results. Accordingly, it is to be understood that although the invention has been described with particular reference to specific embodiments thereof, the forms of the invention shown and described in detail are to be taken as the preferred embodiments of same and that various changes and modifications may be resorted to without departing from the spirit and scope of the invention as defined by the appended claims.

I claim:

1. The process of preparing an extract of aloe vera comprising the steps of:
    a. cutting the rind and aloins of an aloe vera leaf from the gel, and
    b. agitating the gel under U.V. radiation in a digestion liquid containing amine, phosphorous ions and potassium ions while maintaining the pH of the liquid in the range of about 3 to about 4.5.

2. The process of preparing an extract of aloe vera comprising the steps of:
    a. physically separating the rind and aloins of an aloe vera leaf from the gel, and
    b. agitating the gel under U. V. radiation in a digestion liquid containing glycine, citric acid, ascorbic acid, potassium chloride, potassium gluconate, a surfactant and phosphoric acid.

3. The process of forming an attenuated extract of aloe vera juice comprising the steps of
    a. cutting the leaves from an aloe vera plant,
    b. sterilizing said leaves by washing in a chlorine solution,
    c. drying said leaves,
    d. physically removing the rind and aloins from the gel under sterile conditions,
    e. placing the gel in a sterile container,
    f. adding a digestion liquid comprising citric acid, ascorbic acid, glycine, potassium chloride, and potassium gluconate,
    g. agitating the resultant mixture,
    h. adding phosphoric acid and a surfactant to the mixture,
    i. agitating the resultant mixture while exposing said mixture to U.V. radiation for about four hours, and
    j. filtering residual cellulose from the mixture.

4. The process set forth in claim 1 including the additional step of removing residual cellulose from the resulting solution.

5. The process set forth in claim 1 wherein said digestion liquid includes glycine, citric acid, ascorbic acid, potassium chloride, potassium gluconate, a surfactant, and phosphoric acid.

6. The process set forth in claim 1 wherein the gel is separated from the leaf by cutting away the rind and the adjacent layer to a depth of at least ⅛ inch.

7. The product made by the process of claim 1.

* * * * *